US010345891B2

(12) United States Patent
Kanma

(10) Patent No.: US 10,345,891 B2
(45) Date of Patent: Jul. 9, 2019

(54) FIRST INFORMATION PROCESSING APPARATUS, SECOND INFORMATION PROCESSING APPARATUS, INFORMATION PROCESSING SYSTEM, AND INFORMATION PROCESSING METHOD

(71) Applicant: Sony Corporation, Tokyo (JP)

(72) Inventor: Hiroshi Kanma, Chiba (JP)

(73) Assignee: SONY CORPORATION, Tokyo (JP)

( * ) Notice: Subject to any disclaimer, the term of this patent is extended or adjusted under 35 U.S.C. 154(b) by 557 days.

(21) Appl. No.: 13/916,065

(22) Filed: Jun. 12, 2013

(65) Prior Publication Data

US 2013/0342710 A1    Dec. 26, 2013

(30) Foreign Application Priority Data

Jun. 21, 2012  (JP) .................................. 2012-139693

(51) Int. Cl.
*G06F 3/00* (2006.01)
*H04W 48/16* (2009.01)
*H04W 48/20* (2009.01)

(52) U.S. Cl.
CPC ............ *G06F 3/005* (2013.01); *H04W 48/16* (2013.01); *H04W 48/20* (2013.01)

(58) Field of Classification Search
CPC ..... H04W 84/12; H04W 88/08; H04W 48/10; H04W 48/20; H04W 48/16; G06F 15/16; G06F 13/00; G06F 3/005; H04L 43/10; H04L 45/026; H04L 47/28; H04L 65/4076; H04L 12/189; H04L 2012/2841

USPC .......................... 709/228, 224, 227; 370/338
See application file for complete search history.

(56) References Cited

U.S. PATENT DOCUMENTS

| | | | | |
|---|---|---|---|---|
| 8,307,031 B1 * | 11/2012 | Grieve | ..................... | H04L 69/28 709/203 |
| 8,578,022 B2 * | 11/2013 | Bhate | ................... | H04L 63/1425 709/224 |
| 8,830,971 B1 * | 9/2014 | Shipley | ................. | H04W 84/12 370/338 |
| 2002/0184361 A1 * | 12/2002 | Eden | ....................... | H04L 41/22 709/224 |

(Continued)

FOREIGN PATENT DOCUMENTS

JP    2008-219482 A    9/2008

*Primary Examiner* — Davoud A Zand
*Assistant Examiner* — Kristoffer L S Sayoc
(74) *Attorney, Agent, or Firm* — Chip Law Group

(57) ABSTRACT

There is provided a first information processing apparatus capable of wirelessly communicating with a second information processing apparatus, the first information processing apparatus including a storage unit configured to store a maximum number of connections that the first information processing apparatus is able to establish with an apparatus in a network through wireless communication, an identifier generating section configured to generate identifier information of the first information processing apparatus, the identifier information including the stored maximum number of connections, and a transmission unit configured to transmit the generated identifier information to the second information processing apparatus, the second information processing apparatus searching for an apparatus in the network via the first information processing apparatus.

10 Claims, 7 Drawing Sheets

(56) References Cited

U.S. PATENT DOCUMENTS

| | | | |
|---|---|---|---|
| 2008/0205288 A1* | 8/2008 | Herzog | H04L 12/2697 370/252 |
| 2010/0228868 A1* | 9/2010 | Sakai | H04W 28/18 709/228 |
| 2011/0131654 A1* | 6/2011 | Taneja | H04L 63/1416 726/23 |

* cited by examiner

| MAXIMUM WAITING TIME T1 (s) | TIME-OUT T2 (s) |
|---|---|
| MAXIMUM NUMBER OF CONNECTIONS N ×2 (s) | MAXIMUM WAITING TIME T1 +1 (s) |

FIRST INFORMATION PROCESSING APPARATUS, SECOND INFORMATION PROCESSING APPARATUS, INFORMATION PROCESSING SYSTEM, AND INFORMATION PROCESSING METHOD

CROSS-REFERENCE TO RELATED APPLICATION

The present application claims priority from Japanese Patent Application No. JP 2012-139693 filed in the Japanese Patent Office on Jun. 21, 2012, the entire content of which is incorporated herein by reference.

BACKGROUND

The present disclosure relates to a first information processing apparatus, a second information processing apparatus, an information processing system, and an information processing method.

In recent years, wireless Local Area Networks (LANs) defined by the Institute of Electrical and Electronics Engineers (IEEE) 802.11 have been adopted as radio packet communication systems.

In the above-mentioned wireless LANs, an access point is provided in a network. Apparatuses in the network are capable of transmitting and receiving data through wireless communication via the access point (see JP 2008-219482A).

SUMMARY

Incidentally, an apparatus in a network performs a search process for searching for a partner apparatus when communicating with the partner apparatus in the network. In performing the search process, a maximum waiting time is set in a search packet so as to avoid congestion in response packet communication caused by the presence of a great number of apparatuses responding to the search.

A mode in which a long maximum waiting time is set is proposed for appropriately searching for the partner apparatus in the network. However, use of the mode spends a long time from the end of the search to the start of communication with a desired partner apparatus. Accordingly, the usability may decrease.

Therefore, the present disclosure proposes a method for appropriately setting a maximum waiting time such that the usability is prevented from decreasing when a desired apparatus in the network is searched for.

According to an embodiment of the present disclosure, there is provided a first information processing apparatus capable of wirelessly communicating with a second information processing apparatus, the first information processing apparatus including a storage unit configured to store a maximum number of connections that the first information processing apparatus is able to establish with an apparatus in a network through wireless communication, an identifier generating section configured to generate identifier information of the first information processing apparatus, the identifier information including the stored maximum number of connections, and a transmission unit configured to transmit the generated identifier information to the second information processing apparatus, the second information processing apparatus searching for an apparatus in the network via the first information processing apparatus.

According to another embodiment of the present disclosure, there is provided a second information processing apparatus including an apparatus searching section configured to search for an apparatus in a network via a first information processing apparatus, the first information processing apparatus being able to perform wireless communication, a reception unit configured to receive identifier information of the first information processing apparatus from the first information processing apparatus, the identifier information including a maximum number of connections that the first information processing apparatus is able to establish with an apparatus through wireless communication, and a waiting time acquiring section configured to acquire a maximum waiting time based on the maximum number of connections included in the received identifier information, the maximum waiting time indicating a maximum time that the apparatus searching section spends for searching for the apparatus.

According to another embodiment of the present disclosure, there is provided an information processing system including a first information processing apparatus, and a second information processing apparatus configured to be able to wirelessly communicate with the first information processing apparatus. The first information processing apparatus includes a storage unit configured to store a maximum number of connections that the first information processing apparatus is able to establish with an apparatus in a network through wireless communication, an identifier generating section configured to generate identifier information of the first information processing apparatus, the identifier information including the stored maximum number of connections, and a transmission unit configured to transmit the generated identifier information to the second information processing apparatus, the second information processing apparatus searching for an apparatus in the network via the first information processing apparatus. The second information processing apparatus includes an apparatus searching section configured to search for the apparatus in the network via the first information processing apparatus, a reception unit configured to receive the identifier information from the first information processing apparatus, the identifier information including the maximum number of connections, and a waiting time acquiring section configured to acquire a maximum waiting time based on the maximum number of connections included in the received identifier information, the maximum waiting time indicating a maximum time that the apparatus searching section spends for searching for the apparatus.

According to another embodiment of the present disclosure, there is provided an information processing method including generating identifier information including a maximum number of connections that a first information processing apparatus is able to establish with an apparatus in a network through wireless communication, and transmitting the generated identifier information to a second information processing apparatus, the second information processing apparatus searching for an apparatus in the network via the first information processing apparatus.

According to the embodiments of the present disclosure described above, it is possible to appropriately set a maximum waiting time such that the usability can be prevented from decreasing when a desired apparatus is searched for in a network.

DETAILED DESCRIPTION OF THE EMBODIMENT(S)

Figure 1:
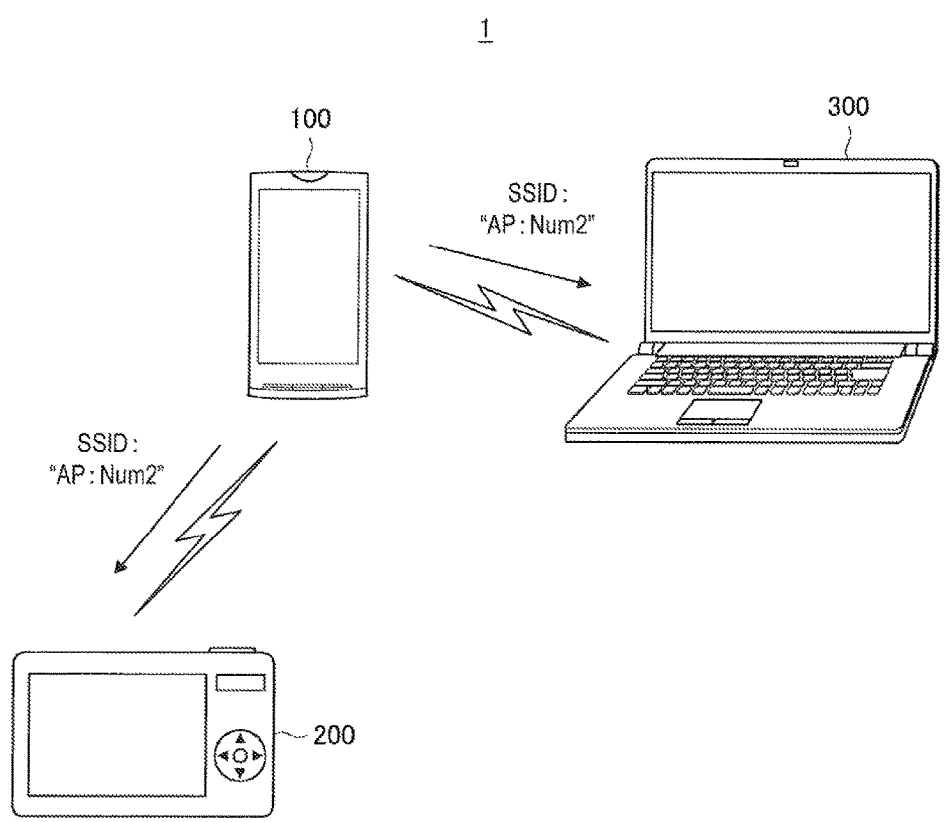
FIG. 1 is a diagram illustrating a configuration of an information processing system 1 according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Overview of Information Processing System
2. Example of Configuration of First Information Processing Apparatus
3. Example of Configuration of Second Information Processing Apparatus
4. Examples of Operations of Information Processing Apparatuses
5. Example of Configuration of Hardware
6. Conclusion

1. Overview of Information Processing System

First, an overview of an information processing system 1 according to an embodiment of the present disclosure will be described with reference to FIG. 1.

FIG. 1 is a diagram illustrating a configuration of the information processing system 1 according to the embodiment of the present disclosure. As illustrated in FIG. 1, the information processing system 1 includes an information processing apparatus 100, an information processing apparatus 200, and a communication terminal 300. Here, the information processing apparatus 100, the information processing apparatus 200, and the communication terminal 300 are in the same wireless communication network (wireless LAN). Additionally, in FIG. 1, the information processing apparatus 100 corresponds to a first information processing apparatus, and the information processing apparatus 200 corresponds to a second information processing apparatus.

The information processing apparatus 100 is a mobile terminal such as a smartphone, and wirelessly communicates with the information processing apparatus 200 and the communication terminal 300. The information processing apparatus 100 includes a function of an access point in a network, and the information processing apparatus 200 and the communication terminal 300 transmit data to and receive data from each other via the information processing apparatus 100.

The information processing apparatus 100 transmits, to the information processing apparatus 200 and the communication terminal 300, identifier information (SSID described below) regarding an identifier of the information processing apparatus 100 in a network. The information processing apparatus 200 and the communication terminal 300 can hereby wirelessly communicate with the information processing apparatus 100, which is an access point.

The information processing apparatus 200 is an imaging apparatus such as a camera, and transmits data to and receives data from the communication terminal 300 via the information processing apparatus 100, which is an access point. For example, the information processing apparatus 200 transmits captured imaging data to the communication terminal 300 via the information processing apparatus 100.

The communication terminal 300 is, for example, a notebook PC. The communication terminal 300 is capable of receiving imaging data from the information processing apparatus 200 via the information processing apparatus 100. The communication terminal 300 includes a display unit 310, and is also capable of displaying the imaging data received from the information processing apparatus 200 via the information processing apparatus 100.

(Search Process for Apparatus in Network)

Incidentally, in the information processing system 1, the information processing apparatus 200 performs a search process for searching for the presence of a connectable apparatus in a network by using, for example, the Universal Plug and Play (UPnP) in order to wirelessly communicate with the apparatus in the network. A maximum waiting time is set in search packets in the search process in order to avoid congestion in response packet communication caused by the presence of a great number of apparatuses responding to the search. Furthermore, the responding apparatuses do not respond immediately after receiving the search packets, but transmit response packets within range of the maximum waiting time.

A mode in which a long maximum waiting time is set is proposed for appropriately searching for an apparatus in a network. However, the use of this mode spends a long time from the end of the search to the start of communication with a desired apparatus, and the usability may decrease. Especially regarding a limited network (network such as Wi-Fi Direct) including, for example, a home network, the number of apparatuses in a network is small so that once a long maximum waiting time is set, the usability remarkably decreases.

Therefore, in the present embodiment, the information processing apparatus 100 includes, into identifier information (SSID) of the information processing apparatus 100 in a network, information regarding the maximum number of connections that the information processing apparatus 100 can establish with an external appliance or external appliances in the network, and transmits the identifier information to the information processing apparatus 200, which performs the search process. The information processing apparatus 200 acquires a maximum waiting time for performing a search process based on the maximum number of connections in the received identifier information.

When searching for an apparatus via the information processing apparatus 100, which is an access point of the network, the information processing apparatus 200 can hereby set a waiting time according to the number of connection apparatuses to which the information processing apparatus 100 can connect. Accordingly, when the number of apparatuses in the network is small, a time from the end of the search to the start of communication with a desired apparatus can be shortened so that the usability can also be prevented from decreasing.

2. Example of Configuration of First Information Processing Apparatus

A functional configuration of the information processing apparatus 100, which is an example of the first information processing apparatus, will be described with reference to FIG. 2.

Figure 2:
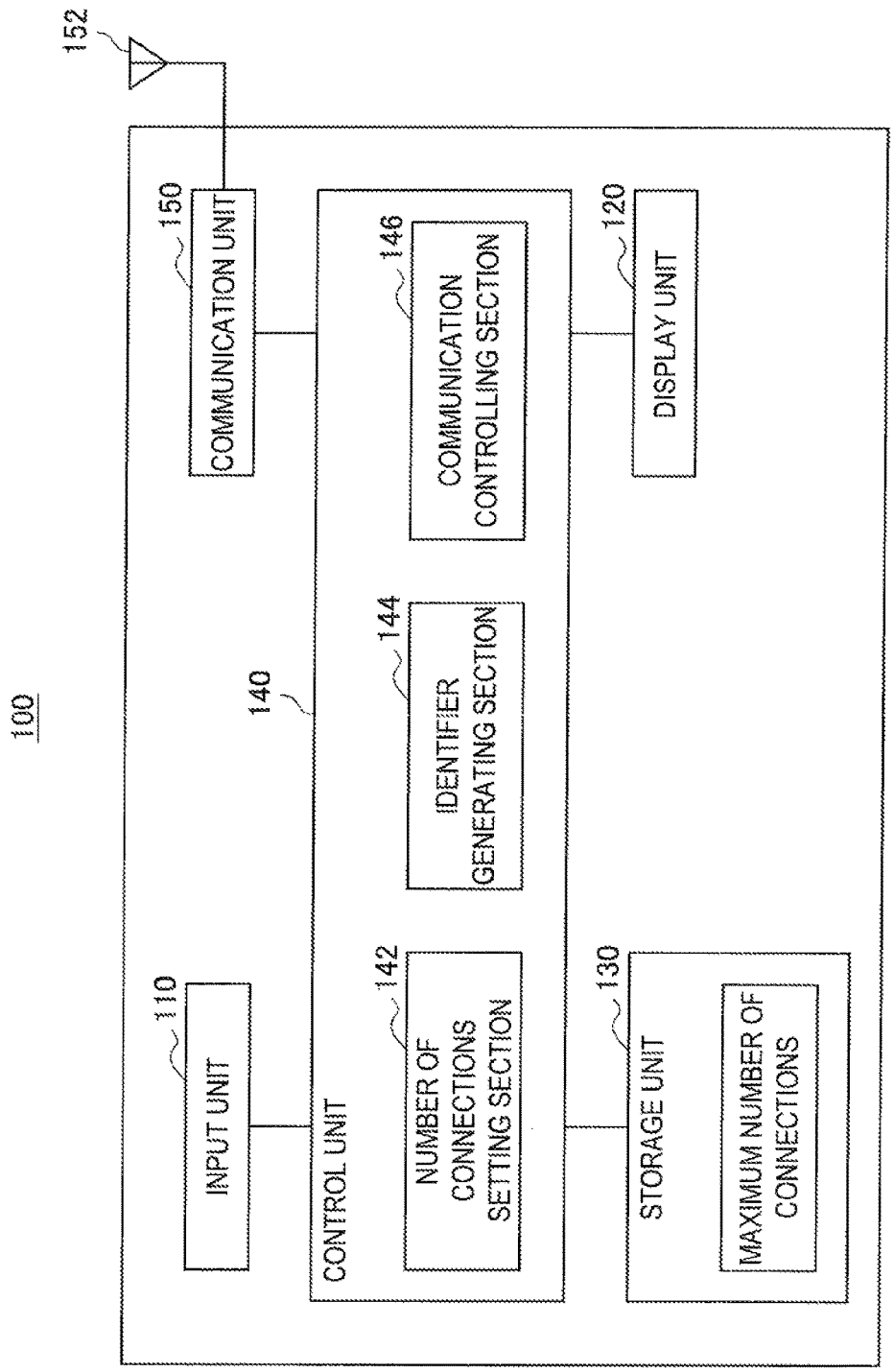
FIG. 2 is a block diagram illustrating an example of a functional configuration of an information processing apparatus 100 according to the embodiment.

FIG. 2 is a block diagram illustrating an example of a functional configuration of the information processing apparatus 100 according to the embodiment. As illustrated in FIG. 2, the information processing apparatus 100 includes an input unit 110, a display unit 120, a storage unit 130, a control unit 140, and a communication unit 150.

The input unit 110 receives an operation input of a user of the information processing apparatus 100. The input unit 110 includes an input apparatus such as a switch, a button, a touch panel, a keyboard, and a mouse.

The display unit 120 includes a function of displaying various types of information based on control performed by the control unit 140. The display unit 120 includes a display apparatus such as a liquid crystal display and an organic EL display.

The storage unit 130 includes a function of storing various types of information used by the control unit 140. In the present embodiment, the storage unit 130 stores the maximum number of connections that the information processing apparatus 100 can establish with an external apparatus or external apparatuses through wireless communication. The storage unit 130 includes a storage apparatus such as a magnetic storage device, a semiconductor storage device, and an optical storage device.

The control unit 140 includes a function of controlling the overall operation of the information processing apparatus 100. The control unit 140 includes, for example, a CPU, ROM, and RAM. As illustrated in FIG. 2, the control unit 140 includes a number of connections setting section 142, an identifier generating section 144, and a communication controlling section 146.

The number of connections setting section 142 sets the maximum number of connections that is stored in the storage unit 130. The maximum number of connections is herein a variable. For example, the maximum number of connections may be set by a user of the information processing apparatus 100. Specifically, the user can input the desired maximum number of connections through the input unit 110 so that a user-friendly system can be constructed.

The information processing apparatus 100 can also execute a plurality of applications, and the maximum number of connections may be set for each application. Consequently, an apparatus that is not associated with an application being executed does not have to be searched for so that a search time can be shortened.

The identifier generating section 144 generates identifier information of the information processing apparatus 100 that includes the maximum number of connections stored in the storage unit 130. The identifier information is, for example, a so-called Service Set Identifier (SSID).

The communication controlling section 146 controls communication of the communication unit 150 with another apparatus (such as the information processing apparatus 200 and the communication terminal 300). The communication controlling section 146 controls the communication unit 150 to transmit and receive a signal for connecting to the other apparatus in the network.

The communication unit 150 is a communication interface including a function as a transmission unit and a reception unit that communicate with an external appliance via an antenna 152. The communication unit 150 includes a communication apparatus such as a wired or wireless LAN, a communication card for Bluetooth, a communication rooter, and a communication modem.

The communication unit 150 transmits the identifier information generated by the identifier generating section 144 to the information processing apparatus 200, which searches for an apparatus that transmits and receives data via the information processing apparatus 100. Specifically, the communication unit 150 transmits a beacon frame including an SSID, which is identifier information, to the information processing apparatus 200, thereby being able to quickly and appropriately inform a communicating apparatus of the maximum number of connections.

Figure 3:
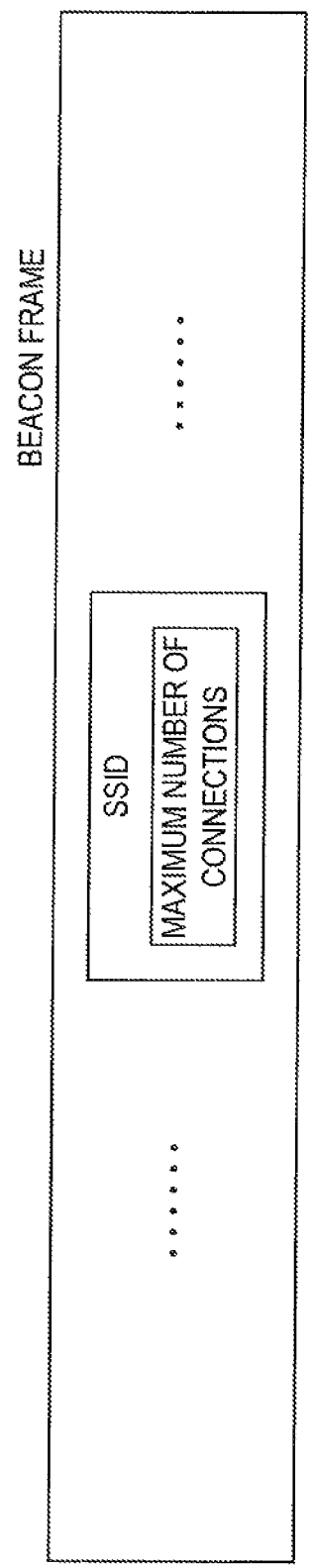
FIG. 3 is a diagram illustrating an example of a beacon frame including SSID.

FIG. 3 is a diagram illustrating an example of a beacon frame including an SSID. The beacon frame illustrated in FIG. 3 includes a plurality of fields, and each field is assigned to the SSID. The SSID field includes the maximum number of connections stored in the storage unit 130. As illustrated in FIG. 1, for example, the maximum number of connections is stored in the SSID field like "AP: Num2," etc.

3. Example of Configuration of Second Information Processing Apparatus

A functional configuration of the information processing apparatus 200, which is an example of the second information processing apparatus, will be described with reference to FIG. 4.

Figure 4:
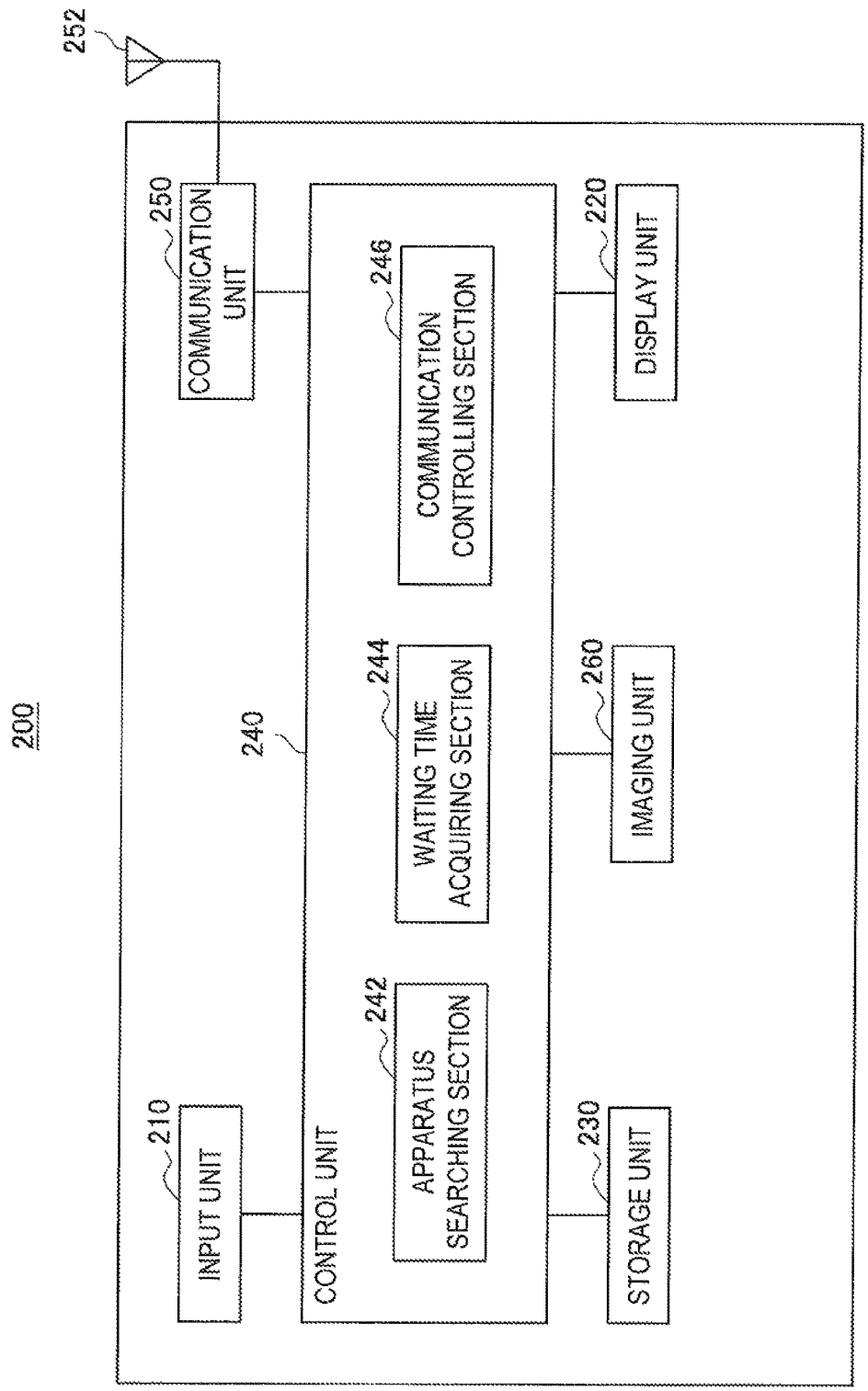
FIG. 4 is a block diagram illustrating an example of a functional configuration of an information processing apparatus 200 according to the embodiment.

FIG. 4 is a block diagram illustrating an example of the functional configuration of the information processing apparatus 200 according to the embodiment. As illustrated in FIG. 4, the information processing apparatus 200 includes an input unit 210, a display unit 220, a storage unit 230, a control unit 240, a communication unit 250, and an imaging unit 260.

The input unit 210 receives an operation input of a user of the information processing apparatus 100. For example, the input unit 210 receives an operation input made by a user who selects which partner apparatus to communicate with among apparatuses searched for in a search process.

The display unit 220 includes a function of displaying various types of information based on control performed by the control unit 240. The display unit 220 displays a selection screen for selecting which partner to wirelessly communicate with, and an image captured by the imaging unit 260.

The storage unit 230 includes a function of storing various types of information used by the control unit 140. For example, the storage unit 230 stores imaging data captured by the imaging unit 260. The storage unit 230 also stores identifier information received from the information processing apparatus 100.

The control unit 240 includes a function of controlling the overall operation of the information processing apparatus 200. As illustrated in FIG. 4, the control unit 240 includes an apparatus searching section 242, a waiting time acquiring section 244, and a communication controlling section 246.

The apparatus searching section 242 searches for an apparatus transmitting and receiving data in the network via the information processing apparatus 100, which is an access point. The apparatus searching section 242 searches for an apparatus within a waiting time that is set by the waiting time acquiring section 244.

When receiving responses from an apparatus or apparatuses corresponding to the same number of apparatuses as the maximum number of connections of the information processing apparatus 100, the apparatus searching section 242 also finishes searching before the elapse of a maximum waiting time that is set by the waiting time acquiring section 244. Since a search process can hereby be quickly finished, a time necessary for the start of communication with a desired apparatus can be shortened.

The waiting time acquiring section 244 acquires a maximum waiting time that the apparatus searching section 242 uses to search for an apparatus or apparatuses, based on the maximum number of connections in the identifier information received via the communication unit 250. For example, the waiting time acquiring section 244 sets a maximum waiting time as a time in proportion to the maximum number of connections. Consequently, a maximum waiting time corresponding to the number of connections of the information processing apparatus 100 in the network can be appropriately set.

The waiting time acquiring section 244 also acquires a time-out time for compulsorily finishing a search process. For example, the waiting time acquiring section 244 acquires, as the time-out time, a time obtained by adding a predetermined time to a maximum waiting time. Here, the predetermined time is obtained by taking into consideration a response time from an apparatus performing the search process.

Figures 5, 6:
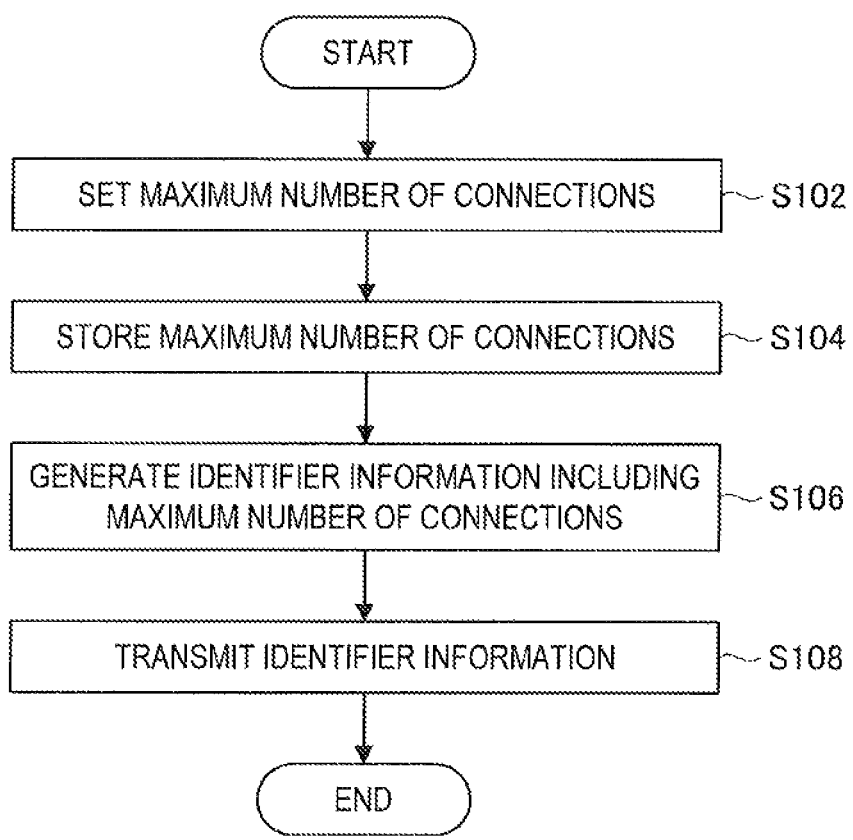
FIG. 5 is a diagram for describing an example of calculation of a maximum waiting time T1 and a time-out time T2.
FIG. 6 is a flowchart illustrating an example of an operation of the information processing apparatus 100 according to the embodiment.

FIG. 5 is a diagram for describing an example of calculation regarding a maximum waiting time T1 and a time-out time T2. As illustrated in FIG. 5, the maximum waiting time T1(s) is, for example, twice the length of time(s) of the maximum number of connections N. The time-out time T2(s) is, for example, the maximum waiting time T1(s)+1(s).

As described above, the maximum waiting time is a time in proportion to the maximum number of connections, but the maximum waiting time is not limited thereto. For example, the maximum time acquiring section 244 calculates a time in proportion to the maximum number of connections, and when the calculated time is greater than a predetermined time t, the waiting time acquiring section 244 may take the predetermined time t for the maximum waiting time. Since, in performing a search process, reception and response from a plurality of partner appliances in a network can be processed in parallel, the reception and the response are apt to be saturated when the number of connections becomes greater than the predetermined number of connections.

More specific description will be made below. Here, the predetermined time is taken for 10(s). Consequently, when the maximum number of connections is equal to or less than 5, the waiting time acquiring section 244 acquires the maximum waiting time as 10(s) since the calculated time is equal to or less than 10(s) (5×2=10) of the predetermined time. Meanwhile, when the maximum number of connections is equal to or greater than 6, the waiting time acquiring section 244 takes 10(s) of the predetermined time for the maximum waiting time since the calculated time is equal to or greater than 12(s) and greater than the predetermined time.

The maximum waiting time T1 may be set as described in the following formula. A proportion of increase in a waiting time with increase in the maximum number of connections N can be reduced.

$$T1 = \sqrt{N} \times 2$$

The communication controlling section 246 controls communication of the communication unit 250 with another apparatus (such as the information processing apparatus 100 and the communication terminal 300). The communication controlling section 246 controls the communication unit 250 to transmit and receive a signal for connecting to the other apparatus in the network.

The communication unit 250 is a communication interface including a function as a transmission unit and a reception unit that communicate with an external appliance via an antenna 252. The communication unit 250 transmits, for example, imaging data captured by the imaging unit 260. The communication unit 250 also receives, from the information processing apparatus 100, identifier information of the information processing apparatus 100 including the maximum number of connections that the information processing apparatus 100 can establish with an apparatus or apparatuses through wireless communication.

The imaging unit 260 includes a function of capturing a subject. The image (still image and moving image) obtained by capturing the subject is stored in the storage unit 230.

4. Examples of Operations of Information Processing Apparatuses

Figure 7:
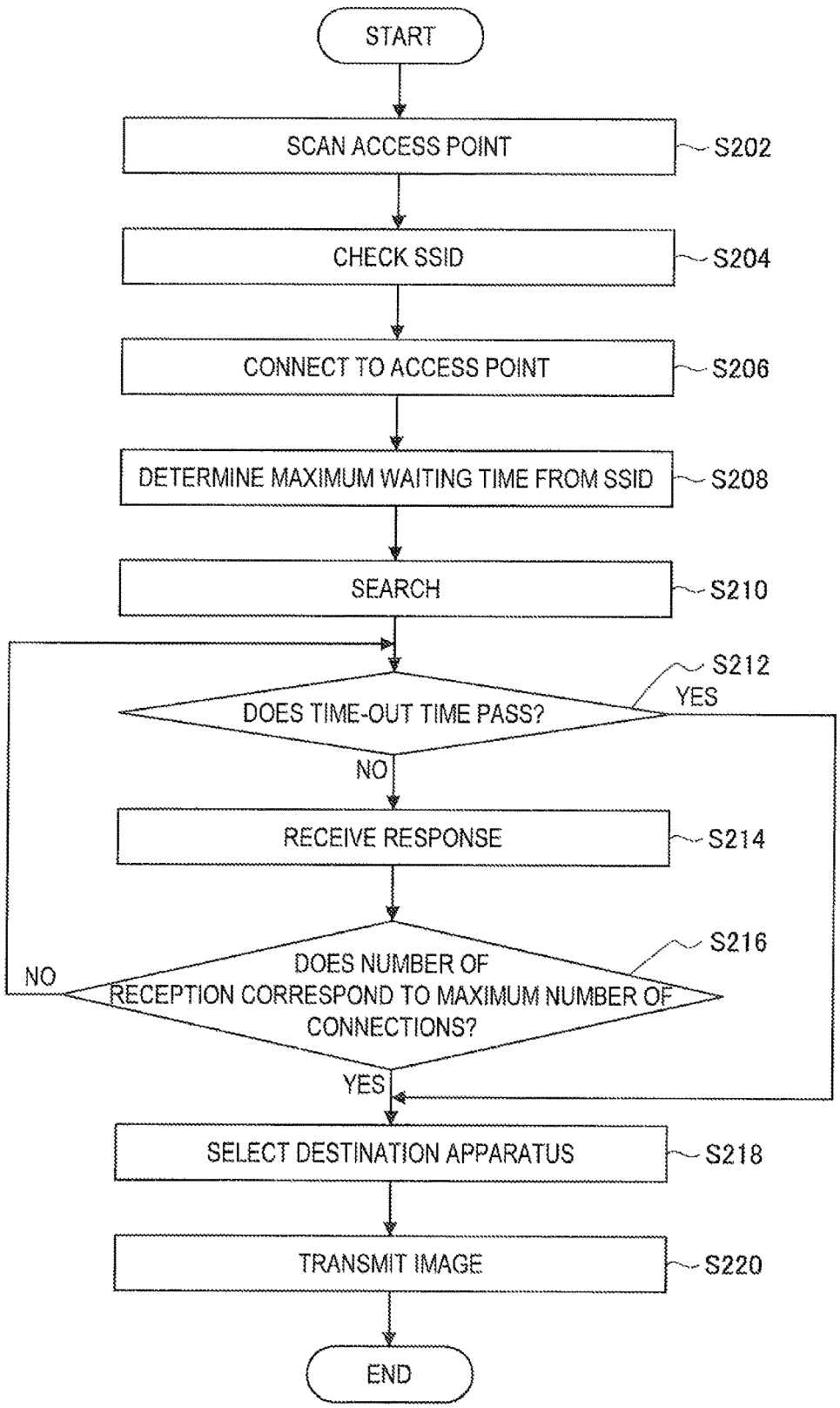
FIG. 7 is a flowchart illustrating an example of an operation of the information processing apparatus 200 according to the embodiment.

Examples of operations of the two information processing apparatuses 100 and 200 will be described below with reference to FIGS. 6 and 7. Processes illustrated in FIGS. 6 and 7 are realized by execution of programs stored in ROM by CPUs of a control unit 140 of the information processing apparatus 100 and a control unit 240 of the information processing apparatus 200.

The programs to be executed may be each stored in a recording medium such as a Compact Disk (CD), a Digital Versatile Disk (DVD), and a memory card, or may be each downloaded from a server or the like via the Internet.

(4-1. Example of Operation of Information Processing Apparatus 100)

FIG. 6 is a flowchart illustrating an example of an operation of the information processing apparatus 100 according to the embodiment. In the processes illustrated in FIGS. 6 and 7, the information processing apparatus 100 and the communication terminal 300 have been already connected to each other.

First, the number of connections setting section 142 of the control unit 140 sets the maximum number of connections that the information processing apparatus 100 can establish with an apparatus or apparatuses (step S102). A user may input the maximum number of connections, or the number of applications to be executed may be taken for the maximum number of connections.

Next, the storage unit 130 stores the maximum number of connections set by the number of connections setting section 142 (step S104). When the maximum number of connections is set for each application, the storage unit 130 stores the maximum number of connections in association with each application.

Next, the identifier generating section 144 generates identifier information (SSID) including the maximum number of connections that is stored in the storage unit 130 (step S106). For example, when receiving a request from the information processing apparatus 200, the identifier generating section 144 generates the identifier information.

Next, the communication controlling section 146 controls the communication unit 150 to transmit, to the information processing apparatus 200, the identifier information generated by the identifier generating section 144 (step S108). Specifically, the communication unit 150 transmits, to the information processing apparatus 200, a beacon frame (FIG. 5) including the identifier information that includes the maximum number of connections.

(4-2. Example of Operation of Information Processing Apparatus 200)

FIG. 7 is a flowchart illustrating an example of an operation of the information processing apparatus 200 according to the embodiment. In FIG. 7, communication between the information processing apparatus 100 and the communication terminal 300 has been established.

First, the apparatus searching section 242 of the control unit 240 searches for an access point in a network (step S202). Here, the apparatus searching section 242 searches for the information processing apparatus 100, which functions as an access point.

Next, the communication controlling section 246 receives a beacon frame from the information processing apparatus 100 to confirm identification information in the beacon frame (step S204). The communication controlling section 246 connects to the information processing apparatus 100 based on the identifier information (step S206).

Next, the waiting time acquiring section 244 acquires a maximum waiting time for searching for an apparatus based on the maximum number of connections in the identifier information received from the information processing apparatus 100 (step S208). For example, when the maximum number of connections is 2, the waiting time acquiring section 244 acquires 4 seconds as the maximum waiting time. The waiting time acquiring section 244 may also obtain a time-out time for searching for an apparatus. For example, when the maximum number of connections is 2, the waiting time acquiring section 244 acquires 5 seconds (the maximum waiting time+1 second) as the time-out time.

Next, the apparatus searching section 242 determines whether a time-out time has passed (step S212).

Until the time-out time has passed (step S212: No), the apparatus searching section 242 receives a response from an apparatus in the network. When the time-out time has passed (step S212: Yes), the apparatus searching section 242 finishes a process for searching for an apparatus.

When an apparatus is present in the network, the apparatus searching section 242 receives a response from the apparatus (step S214). The apparatus searching section 242 determines whether the number of apparatuses transmitting responses reaches the maximum number of connections (step S216).

When the number of responses does not reach the maximum number of connections in step S216 (No), the apparatus searching section 242 repeats the above-described process. To the contrary, when the number of responses reaches the maximum number of connections in step S216 (Yes), the apparatus searching section 242 finishes the search process even if the time-out time has not yet passed.

Next, a user uses the input unit 210 to select an apparatus to which data is transmitted (step S218), and the communication controlling section 246 transmits the data to the selected apparatus (step S220). For example, the communication controlling section 246 transmits imaging data to the communication terminal 300 via the information processing apparatus 100. Consequently, the communication terminal 300 displays the received imaging data on a display unit.

5. Configuration of Hardware

The above-described display control operations performed by the information processing apparatuses 100 and 200 are realized through cooperation of hardware configurations and software included in the information processing apparatuses 100 and 200. Since the information processing apparatuses 100 and 200 have similar hardware configurations, the hardware configuration of the information processing apparatus 200 will be described as an example below.

Figure 8:
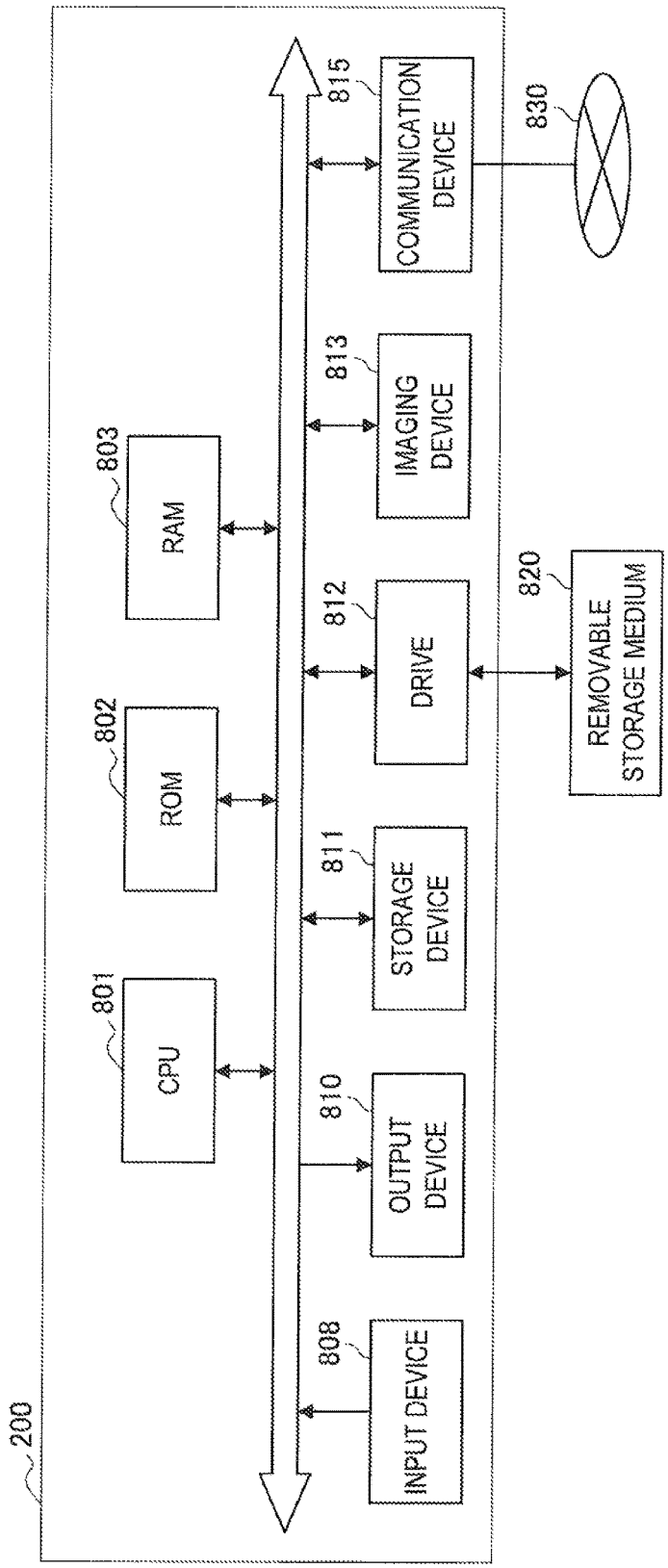
FIG. 8 is a diagram describing a hardware configuration of the information processing apparatus 200.

FIG. 8 is a diagram describing the hardware configuration of the information processing apparatus 200. As illustrated in FIG. 8, the information processing apparatus 200 includes a Central Processing Unit (CPU) 801, Read Only Memory (ROM) 802, Random Access Memory (RAM) 803, an input device 808, an output device 810, a storage device 811, a drive 812, an imaging device 813, and a communication device 815.

The CPU 801 functions as a processing unit and a control device, and controls the overall operation in the information processing apparatus 200 in accordance with various types of programs. The CPU 801 may also be a microprocessor. The ROM 802 stores a program, an operational parameter, or the like used by the CPU 801. The RAM 803 temporarily stores a program executed by the CPU 801, a parameter varying during the execution, or the like. A host bus including a CPU bus interconnects them.

The input device 808 includes an input mechanism such as a mouse, a keyboard, a touch panel, a button, a microphone, a switch, and a lever that allows a user to input information, and an input control circuit that generates an input signal based on an input made by the user and outputs the input signal to the CPU 801. The user of the information processing apparatus 200 can input various types of data into the information processing apparatus 200 by operating the input device 808 and issue an instruction regarding a processing operation.

The output device 810 includes a display device such as a liquid crystal display (LCD) device, an Organic Light Emitting Diode (OLED) device, and a lamp. Furthermore, the output device 810 includes an audio output device such as a speaker and a headphone. For example, the display device displays a captured image, a generated image, or the like. To the contrary, the audio output device converts audio data or the like into a sound and outputs the sound.

The storage device 811 is a device for storing data that is configured as an example of a storage unit included in the information processing apparatus 200 according to the present embodiment. The storage device 811 may include a storage medium, a recording device for recording data on a storage medium, a readout device for reading out data from a storage medium, and a deletion device for deleting data stored on a storage medium. The storage device 811 stores a program and various types of data executed by the CPU 801.

The drive 812 is a reader/writer for a storage medium, and is built in or externally attached to the information processing apparatus 200. The drive 812 reads out information stored in a removable storage medium 820 such as an attached magnetic disk, an optical disc, a magneto-optical disk, and semiconductor memory, and outputs the information to the RAM 803. The drive 812 can also write information into the removable storage medium 820.

The imaging device 813 includes an imaging optical system such as an imaging lens and a zoom lens for collecting light, and a signal conversion element such as a Charge Coupled Device (CCD) and a Complementary Metal Oxide Semiconductor (CMOS). The imaging optical system collects light emitted from a subject, and forms the subject on a signal converter. The signal conversion element converts the formed subject image into an electrical image signal.

The communication device 815 is, for example, a communication interface including a communication device for connecting to a network 830. The communication device 815 may also be a communication device for a wireless Local Area Network (LAN) or Long Term Evolution (LTE), or may be a wire communication device for performing wired communication.

The network 830 is a wired or wireless transmission path for information transmitted from an apparatus that is connected to the network 830. For example, the network 830 may include the public networks such as the Internet, the telephone network and the satellite communication network, and various types of Local Area Networks (LANs) and Wide Area Networks (WANs) including Ethernet (registered trademark). The network 830 may also include private line networks such as an Internet Protocol-Virtual Private Network (IP-VPN).

6. Conclusion

As described above, the information processing apparatus 100 according to the embodiment of the present disclosure includes, into identifier information of the information processing apparatus 100 in a network, information regarding the maximum number of connections that the information processing apparatus 100 can establish with an external appliance or external appliances, and transmits the information to the information processing apparatus 200, which performs a search process. The information processing apparatus 200 acquires a maximum waiting time for performing the search process based on the maximum number of connections in the received identifier information.

Consequently, when searching for an apparatus (communication terminal 300) via the information processing apparatus 100, which is an access point in the network, the information processing apparatus 200 can set a waiting time according to the number of connection apparatuses to which the information processing apparatus 100 can connect. Therefore, when there are few apparatuses in the network, a time from the end of the search to the start of communication with a desired apparatus can be shortened so that the usability can be prevented from decreasing.

As described above, the information processing apparatus 200 can also identify the number of apparatuses that respond to the search. Accordingly, when receiving a response or responses from an apparatus or apparatuses the number of which corresponds to the maximum number of connections, the information processing apparatus 200 can finish the search process before the elapse of the time-out.

Thus, according to the embodiment of the present disclosure, a time used for searching for an apparatus in the network can be shortened. As a result, connection among apparatuses can be accelerated. Since an SSID is recognized in a Wi-Fi communication appliance, the SSID is effective when the Wi-Fi communication appliance is used. Furthermore, when a network is constructed in accordance with an environment as done in Wi-Fi Direct, one search time is not fixed, but an appropriate search time is set in accordance with a predicted network topology to increase the usability for a user.

It should be understood by those skilled in the art that various modifications, combinations, sub-combinations and alterations may occur depending on design requirements and other factors insofar as they are within the scope of the appended claims or the equivalents thereof.

Although a smartphone and a camera are used as an information processing apparatus in the above-described embodiment, the information processing apparatus is not limited thereto. For example, the information processing apparatus may be a PDA, a game device, a notebook PC, and the like.

The steps illustrated in the flowcharts in the above-described embodiment naturally include processes performed in the described and chronological order, and further include processes that are not necessarily performed in chronological order, but are also performed in parallel or are individually performed. It is also possible to change the order as necessary even in the steps for chronologically performing the processes.

A process performed by the information processing apparatus described in the present specification may be realized by using any one of software, hardware, and a combination of software and hardware. A program included in software is stored in advance in, for example, a storage medium that is built in or externally provided to each apparatus. When executed, programs are each read out in, for example, Random Access Memory (RAM), and executed by a processor such as a CPU.

Additionally, the present technology may also be configured as below.

(1) A first information processing apparatus capable of wirelessly communicating with a second information processing apparatus, the first information processing apparatus including:
    a storage unit configured to store a maximum number of connections that the first information processing apparatus is able to establish with an apparatus in a network through wireless communication;
    an identifier generating section configured to generate identifier information of the first information processing apparatus, the identifier information including the stored maximum number of connections; and
    a transmission unit configured to transmit the generated identifier information to the second information processing apparatus, the second information processing apparatus searching for an apparatus in the network via the first information processing apparatus.

(2) The first information processing apparatus according to (1),
    wherein the maximum number of connections is a variable.

(3) The first information processing apparatus according to (2),
    wherein the first information processing apparatus is able to execute a plurality of applications, and
    wherein the maximum number of connections is set for each application.

(4) The first information processing apparatus according to (2) or (3),
    wherein the maximum number of connections is set by a user of the first information processing apparatus.

(5) The first information processing apparatus according to any one of (1) to (4), wherein the first information processing apparatus is an access point used when the second information processing apparatus wirelessly communicates with another apparatus.

(6) A second information processing apparatus including:
an apparatus searching section configured to search for an apparatus in a network via a first information processing apparatus, the first information processing apparatus being able to perform wireless communication;
a reception unit configured to receive identifier information of the first information processing apparatus from the first information processing apparatus, the identifier information including a maximum number of connections that the first information processing apparatus is able to establish with an apparatus through wireless communication; and
a waiting time acquiring section configured to acquire a maximum waiting time based on the maximum number of connections included in the received identifier information, the maximum waiting time indicating a maximum time that the apparatus searching section spends for searching for the apparatus.

(7) The second information processing apparatus according to (6),
wherein the waiting time acquiring section acquires the maximum waiting time as a time in proportion to the maximum number of connections.

(8) The second information processing apparatus according to (6),
wherein the waiting time acquiring section calculates a time in proportion to the maximum number of connections, and
wherein, when the calculated time is greater than a predetermined time, the waiting time acquiring section acquires the maximum waiting time as the predetermined time.

(9) The second information processing apparatus according to any one of (6) to (8),
wherein, when receiving a response from an apparatus a number of which corresponds to the maximum number of connections, the apparatus searching section finishes searching before an elapse of the maximum waiting time.

(10) An information processing system including:
a first information processing apparatus; and
a second information processing apparatus configured to be able to wirelessly communicate with the first information processing apparatus,
wherein the first information processing apparatus includes
a storage unit configured to store a maximum number of connections that the first information processing apparatus is able to establish with an apparatus in a network through wireless communication,
an identifier generating section configured to generate identifier information of the first information processing apparatus, the identifier information including the stored maximum number of connections, and
a transmission unit configured to transmit the generated identifier information to the second information processing apparatus, the second information processing apparatus searching for an apparatus in the network via the first information processing apparatus, and
wherein the second information processing apparatus includes
an apparatus searching section configured to search for the apparatus in the network via the first information processing apparatus,
a reception unit configured to receive the identifier information from the first information processing apparatus, the identifier information including the maximum number of connections, and
a waiting time acquiring section configured to acquire a maximum waiting time based on the maximum number of connections included in the received identifier information, the maximum waiting time indicating a maximum time that the apparatus searching section spends for searching for the apparatus.

(11) An information processing method including:
generating identifier information including a maximum number of connections that a first information processing apparatus is able to establish with an apparatus in a network through wireless communication; and
transmitting the generated identifier information to a second information processing apparatus, the second information processing apparatus searching for an apparatus in the network via the first information processing apparatus.

What is claimed is:

1. A first information processing apparatus, comprising:
a memory unit configured to store a number of connections that the first information processing apparatus is configured to establish with at least one apparatus in a network via wireless communication; and
at least one processor configured to:
generate a service set identifier (SSID) of the first information processing apparatus, wherein the SSID includes information of the stored number of connections; and
transmit the generated SSID to a second information processing apparatus in the network via the wireless communication, wherein
the second information processing apparatus:
calculates a first time in proportion to the number of connections indicated in the SSID,
acquires a waiting time in proportion to the number of connections based on the calculated first time that is less than or equal to a determined time,
acquires the waiting time as the determined time based on the calculated first time that is greater than the determined time,
acquires a time-out time for search of the at least one apparatus, and
searches for the at least one apparatus in the network via the first information processing apparatus for the time-out time,
the time-out time is obtained by an addition of a second time to the waiting time,
the second time is based on a response time from the second information processing apparatus,
the second information processing apparatus stops the search for the at least one apparatus before an elapse of the time-out time, based on reception of a number of responses from the at least one apparatus that is equal to the stored number of connections.

2. The first information processing apparatus according to claim 1, wherein the stored number of connections is a variable.

3. The first information processing apparatus according to claim 2, wherein the at least one processor is further configured to:

execute a plurality of applications; and
set the number of connections for each application of the plurality of applications.

4. The first information processing apparatus according to claim 2, wherein the at least one processor is further configured to set the number of connections based on a user operation.

5. The first information processing apparatus according to claim 1, wherein the first information processing apparatus is used as an access point based on the wireless communication of the second information processing apparatus with the at least one apparatus in the network.

6. A first information processing apparatus, comprising:
at least one processor configured to:
search for at least one apparatus in a network via a second information processing apparatus, wherein the second information processing apparatus communicates wirelessly;
receive a service set identifier (SSID) of the second information processing apparatus from the second information processing apparatus, wherein the SSID includes information of a number of connections that the second information processing apparatus establishes with the at least one apparatus in the network via wireless communication;
calculate a first time in proportion to the number of connections;
acquire a waiting time in proportion to the number of connections based on the calculated first time that is less than or equal to a determined time;
acquire the waiting time as the determined time based on the calculated first time that is greater than the determined time;
acquire a time-out time for the search of the at least one apparatus, wherein
the time-out time is spent to search for the at least one apparatus,
the time-out time is obtained by an addition of a second time to the waiting time, and
the second time is based on a response time from the second information processing apparatus; and
stop the search for the at least one apparatus before an elapse of the time-out time based on reception of a number of responses from the at least one apparatus that is equal to the number of connections.

7. The first information processing apparatus according to claim 6, wherein the waiting time corresponds to twice the number of connections.

8. An information processing system, comprising:
a first information processing apparatus; and
a second information processing apparatus configured to wirelessly communicate with the first information processing apparatus,
wherein the first information processing apparatus includes:
a memory unit configured to store a number of connections that the first information processing apparatus is configured to establish with at least one apparatus in a network via wireless communication, and
a first set of processors configured to:
generate a service set identifier (SSID) of the first information processing apparatus, wherein the SSID includes information of the stored number of connections; and
transmit the generated SSID to the second information processing apparatus, and wherein the second information processing apparatus includes:
a second set of processors configured to:
receive the SSID from the first information processing apparatus;
calculate a first time in proportion to the number of connections indicated in the received SSID;
acquire a waiting time in proportion to the number of connections based on the calculated first time that is less than or equal to a determined time;
acquire the waiting time as the determined time based on the calculated first time that is greater than the determined time;
acquire a time-out time for search of the at least one apparatus, wherein
the time-out time is obtained by an addition of a second time to the waiting time, and
the second time is based on a response time from the second information processing apparatus;
search for the at least one apparatus in the time-out time; and
stop the search for the at least one apparatus before an elapse of the time-out time based on reception of a number of responses from the at least one apparatus that is equal to the number of connections.

9. An information processing method, comprising:
generating a service set identifier (SSID) of a first information processing apparatus, wherein the SSID includes information of a number of connections that the first information processing apparatus establishes with at least one apparatus in a network via wireless communication; and
transmitting the generated SSID to a second information processing apparatus, wherein
the second information processing apparatus:
calculates a first time in proportion to the number of connections indicated in the SSID,
acquires a waiting time in proportion to the number of connections based on the calculated first time that is less than or equal to a determined time,
acquires the waiting time as the determined time based on the calculated first time that is greater than the determined time, and
acquires a time-out time for search of the at least one apparatus, wherein
the time-out time is obtained by adding a second time to the waiting time,
the second time is based on a response time from the second information processing apparatus,
the second information processing apparatus searches for the at least one apparatus in the network via the first information processing apparatus for the time-out time,
the second information processing apparatus stops the search for the at least one apparatus before an elapse of the time-out time, based on reception of a number of responses from the at least one apparatus that is equal to the number of connections.

10. The first information processing apparatus according to claim 1, wherein
the at least one processor is further configured to transmit a beacon frame that includes a plurality of fields,
each field of the plurality of fields is an SSID field, and
the SSID field stores the number of connections.

* * * * *